United States Patent
Kim et al.

(10) Patent No.: US 7,072,401 B2
(45) Date of Patent: Jul. 4, 2006

(54) DIGITAL TV SYSTEM WITH PVR FUNCTION AND METHOD FOR MAKING STREAM JUMP THEREIN

(75) Inventors: Tae Hyoung Kim, Seoul (KR); Eunsam Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 679 days.

(21) Appl. No.: 10/254,683

(22) Filed: Sep. 26, 2002

(65) Prior Publication Data

US 2003/0076887 A1     Apr. 24, 2003

(30) Foreign Application Priority Data

Sep. 26, 2001    (KR) ................................ 2001-59640

(51) Int. Cl.
*H04N 7/12*     (2006.01)

(52) U.S. Cl. .................. 375/240.25; 375/240.26; 725/88; 725/102; 386/69

(58) Field of Classification Search .......... 375/240.25, 375/240.26; 725/88–90, 102, 133, 141, 153; 386/68, 69

See application file for complete search history.

(56) References Cited

U.S. PATENT DOCUMENTS

| | | | |
|---|---|---|---|
| 6,157,771 A * | 12/2000 | Brewer et al. | 386/69 |
| 6,654,539 B1 * | 11/2003 | Duruoz et al. | 386/68 |
| 6,658,199 B1 * | 12/2003 | Hallberg | 386/68 |
| 2002/0085831 A1 * | 7/2002 | Mishima et al. | 386/68 |

* cited by examiner

*Primary Examiner*—Vu Le
(74) *Attorney, Agent, or Firm*—Birch, Stewart, Kolasch & Birch, LLP

(57) ABSTRACT

Digital TV system with a PVR function and method for making a stream jump therein, wherein, upon reception of a stream jump order from a user, searching the storage medium for a target GOP the user, or a system designated, changing a reproducing position to a TP next to a TP having a picture header among TPs in a prior picture positioned right forward of the searched target GOP, and starting reproduction from the changed reproducing position, thereby preventing occurrence of a decoding error while maintaining continuity of CC values in decoding TPs of a target GOP, to permit no broking of picture even in the stream jump.

20 Claims, 7 Drawing Sheets

DIGITAL TV SYSTEM WITH PVR FUNCTION AND METHOD FOR MAKING STREAM JUMP THEREIN

This application claims the benefit of the Korean Application No. P2001-59640 filed on Sep. 26, 2001, which is hereby incorporated by reference.

BACKGROUND OF THE INVENTION

1. Field of the Invention

The present invention relates to a stream jump in a digital TV system for a personal video recorder (PVR), more particularly, to a digital TV system in which a stream jump can be made without an error of a continuity counter (CC) value, and a method for making a stream jump therein.

2. Background of the Related Art

Recently, amid the full scale start of digital TV (DTV) broadcasting, and spreading of DTV receivers, DTVs with various attached functions are on stage for meeting various users' demands.

As one of the DTV attached functions that are paid attention, the PVR function provides various reproducing function by using large capacity storage medium. As the storage medium for the PVR, a hard disk is employed, which in general provide a large capacity at a low price enough to store a long time of TV program.

Basically, the PVR has no great difference from present VCR (Video Cassette Recorder) in view of providing a function for recording a program. However, since the PVR is based on a digital broadcasting signal, the PVR has features of the digital broadcasting, such as simultaneous recording of different programs, and individual program watching suit to own needs regardless of broadcasting time table of the broadcasting station. Moreover, different from the present analog VCR tape, as audio, and video information is recorded in digital data, the PVR assures a picture quality of no information loss, even after countless times of recording and reproduction. Furthermore, the PVR has a time shift function which permits the user simultaneous storage, and reproduction of a program the user watches at the present time.

One of merits of the PVR is that the PVR provides a stream jump function, such as instant replay, advertisement skip, section repetition, fast forward, fast rewind, and the like during watching a program.

Meanwhile, for more effective signal transmission, the digital broadcasting digitizes, and compresses various audio, video, and other attached information, and converts into a transport stream by using a multiplexer before transmission. The video is compressed according the MPEG-2 (Moving Picture Experts Group-2) algorithm, the transport stream is transmitted in packet units each with a fixed size of 188 bytes (called as TP), and decoded in the TP units at a receiver side.

The MPEG-2 handles images in units of 'picture' (one full screen of an image), when a frame, or a field may be allocated to the picture. That is, when the frame is allocated to the picture, it is called as a frame structure, and when the field is allocated to the picture, it is called as a field structure.

Figure 1:
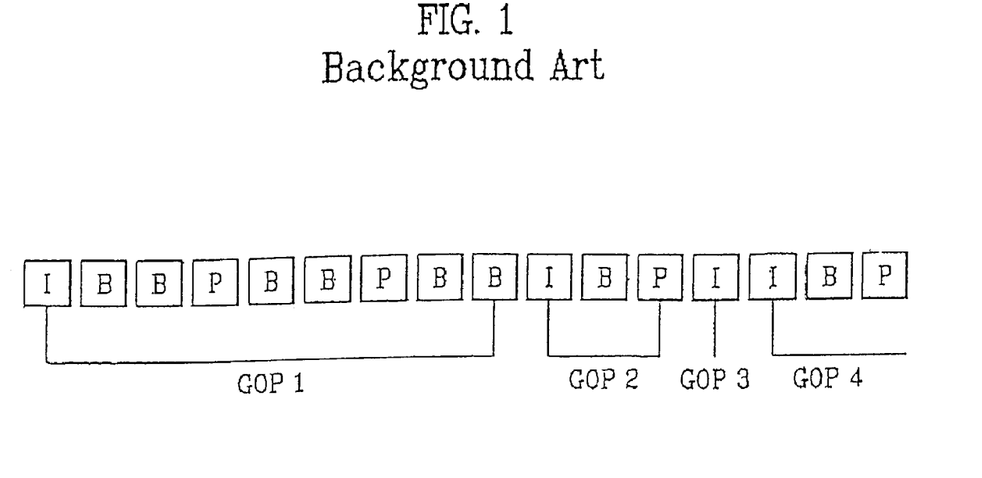
FIG. 1 illustrates a relation between picture forms and GOPs defined in the MPEG-2.
Figure 2:
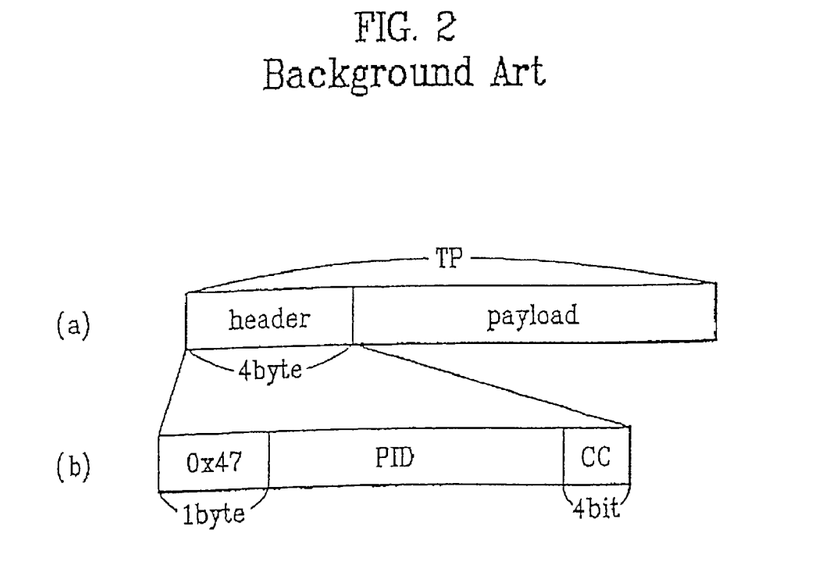
FIG. 2 illustrates an example of a structure of a transport stream packet (TP) defined in the MPEG-2.

There are three picture types I, P, B in terms of pictures the MPEG-2 defines. The I picture is one in which simply only the picture is subjected to DCT (Discrete Cosine Transform) for coding without motion compensation, and the P picture is one in which motion compensation is made based on an I, or other P picture, and remained difference is subjected to DCT. The B (Birdirectionally predicted-coded) is one in which though the motion compensation is made the same with the P picture, different from the P picture, the motion compensation is made from two pictures in front and rear of a time axis. Eventually, a picture sequence of the MPEG-2 has a structure like ----, B, B, I, B, B, P, B, B, P, B, B, ----, wherein, in view of a sequence of display, pictures starting from the B picture two pictures ahead of the I picture to the P picture ahead of the next I picture is called as a GOP (Group Of Pictures). However, referring to FIG. 1, in view of a transmission sequence, the GOP is from an I picture to a picture ahead of the next I picture. When it is assumed that a number of pictures in the GOP is represented with 'N', and a number of pictures between I and P pictures, or P and P pictures is represent with 'M', the 'N' and 'M' values vary within one sequence. A sequence header may be inserted in a starting position of every GOP, and a picture header is inserted in a picture starting position of every picture in the GOP. That is, the picture consists of the picture header and a payload, wherein, in general, picture header information is loaded on one or two TPs, including information required for decoding data of a payload portion, and actual data of the payload portion is loaded on more than a few tens of TPs.

The MPEG-2 transport stream consists of packets each with 188 bytes, each of which consists of a packet header with 4 bytes, and a payload of 184 bytes. The first byte of the packet header is a synchronization byte, having a value of 0'47 for all the packets. The packet header has a PID (Packet Identifier) number for identifying a signal on the payload. The payload has a video PES (Packetized Elementary Stream), an audio PES, and a PSI (Program Specific Information) PES. That is, a PID is provided to each video PES, each audio PES, and each PSI. Therefore, once the header information of a TP is detected, it can be known whether a data at the payload of the TP is the video PES, the audio PES, or the PSI PES. The PSI has various information provided for convenience of viewers from the broadcasting station, and video and audio PID numbers of programs of the broadcasting station.

Therefore, when the viewer intends to watch a broadcasting of a particular broadcasting station, the TV receiver detects the audio, and video PID numbers for a selected broadcasting with reference to the PSI, and a demultipixer extracts only a video signal and an audio signal having the particular PID, thereby permits the watcher to watch the video, and the audio.

Figure 3:
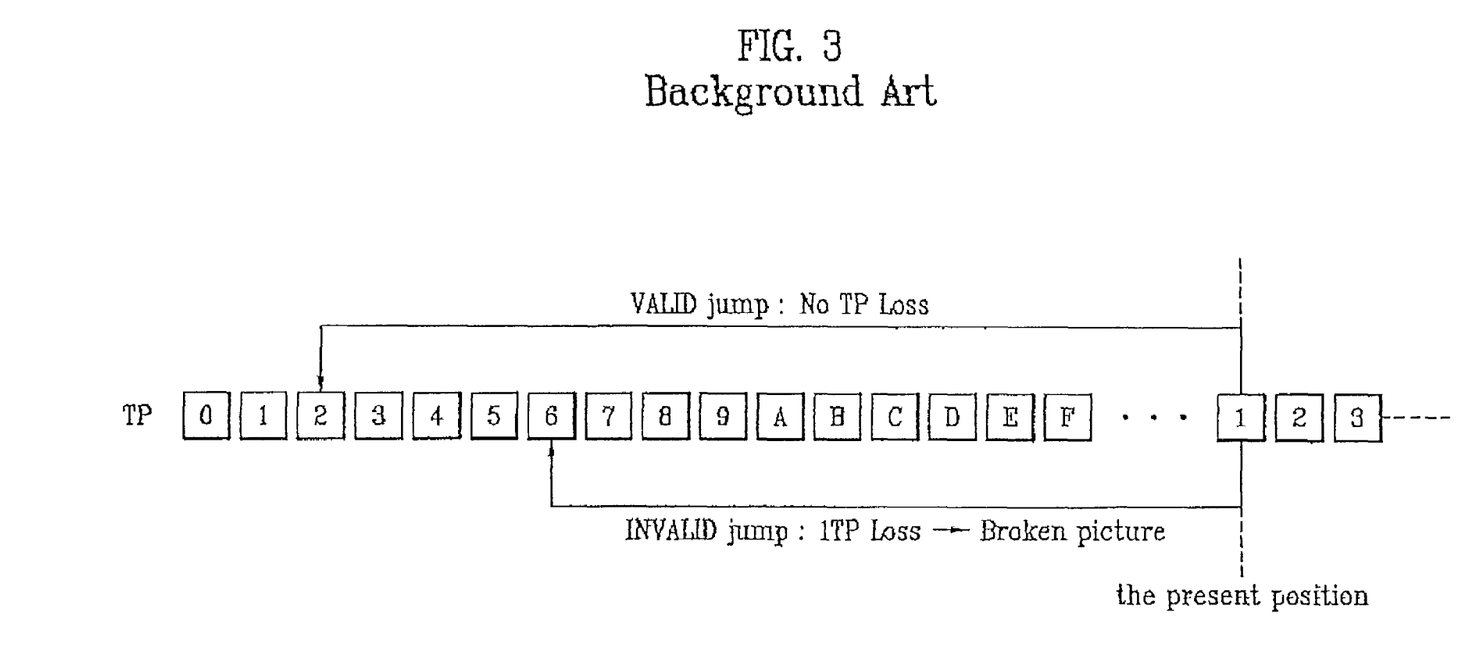
FIG. 3 illustrates an example of a CC value given to every TP in FIG. 2, and an example of a stream jump.

There is also a CC (Continuity Counter) region of 4 bits at an end part of the packet header for detecting a transmission error within the PID, where, as shown in FIG. 3, numerals starting from 0 to 15 are recorded in a progressively increasing order.

If a TP is lost in the middle of transmission, since there will be a gap in the CC values which are to progressively increase, a decoded can sense an error in reception of TP, according to which an appropriate action can be taken. For an example, if the CCs are the same for two successive TPs having the same PID, it is regarded as duplication of packets, and the TP received presently is discarded. If the CC values have a difference two or more than two, it is regarded as a packet loss, the presently received TP is not decoded, but discarded, and the decoding starts from the next TP.

Figure 4:
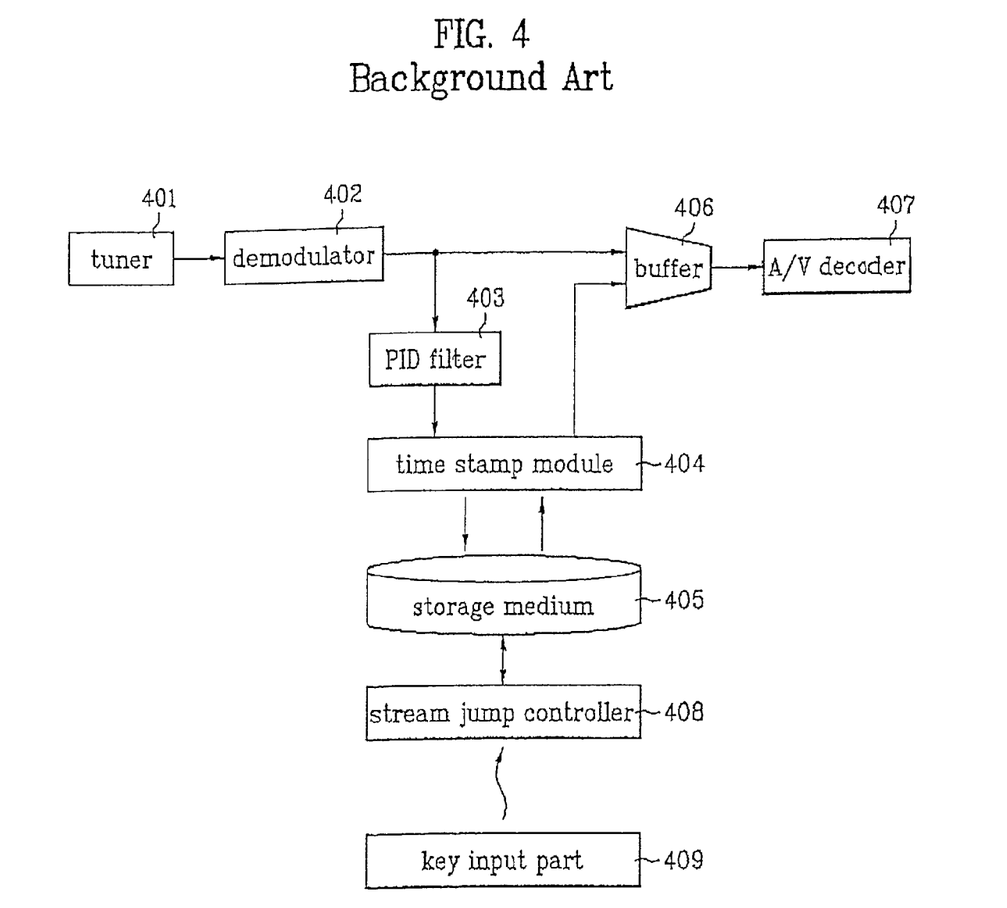
FIG. 4 illustrates a block diagram of a related art DTV with a PVR function, schematically.

FIG. 4 illustrates a block diagram of a related art DTV with a PVR function, schematically.

Referring to FIG. 4, there is a tuner 401 for selecting a RF signal on a particular channel from signals from broadcasting stations, converting an IF signal, and providing to a demodulator 402, and the demodulator 402 demodulates and digitizes the IF signal of the particular channel, and provides the IF signal in a transport stream (TS). The TS is provided to a buffer 406 for display, and to a PID filer 403 for storage in a storage medium 405.

The TS stored in the buffer 406 is provided to an A/V decoder 407, and the A/V decoder 407 splits an audio stream and a video stream from the transport stream having the audio stream and the video stream multiplexed therein, decoded at respective decoders, and presented to speakers and TV screen, respectively.

When it is intended to record a broadcasting signal in the storage medium 405, the transport stream is not decoded, but recorded in the storage medium 405 directly through the PID filter 403 and a time stamp module 404. Thereafter, when it is intended to reproduce the broadcasting signal recorded on the storage medium 405, the transport stream stored in the storage medium 405 is respectively audio, and video decoded in the A/V decoder 407 through the time stamp module 404, and the buffer 406, and presented to the speakers and the TV screen, respectively.

The PID filter 403 filters packets having video PIDs and audio PIDs of the program to be stored from TPs demodulated by using PID information in the header regions of the TPs, and provides to the time stamp module 404.

The time stamp module 404 inserts time stamps to the filtered video and audio transport packets for marking received times, and records on the storage medium 405. In reproduction, the time stamp module 404 transmits reproduced TPs to the A/V decoder 407 through the buffer 406 while sustaining an exact bit rate with reference to the time stamp on the TP reproduced from the storage medium 405. This is for prevention of a decoding error caused by overflow, or underflow of the decoder buffer. In this instance, the time stamp is removed from the reproduced TP, and transmitted to the buffer 406. That is, the time stamp is only referred to in the reproduction.

The time stamp is added to the TP to be recorded on the storage medium 405 for making a reproduction rate in a later reproduction the same with the time of initial transmission.

A related art method for making a stream jump in a digital TV with a PVR function will be reviewed.

In general, a method for making a stream jump in an MPEG-2 stream is a GOP (Group Of Picture) skip method, i.e., detecting a picture index of each GOP, and shifting a reproducing position to a GOP having desired information, i.e., a target GOP. As the digital broadcasting is the MPEG-2 stream too, the same method is applied to the PVR.

Figure 5:
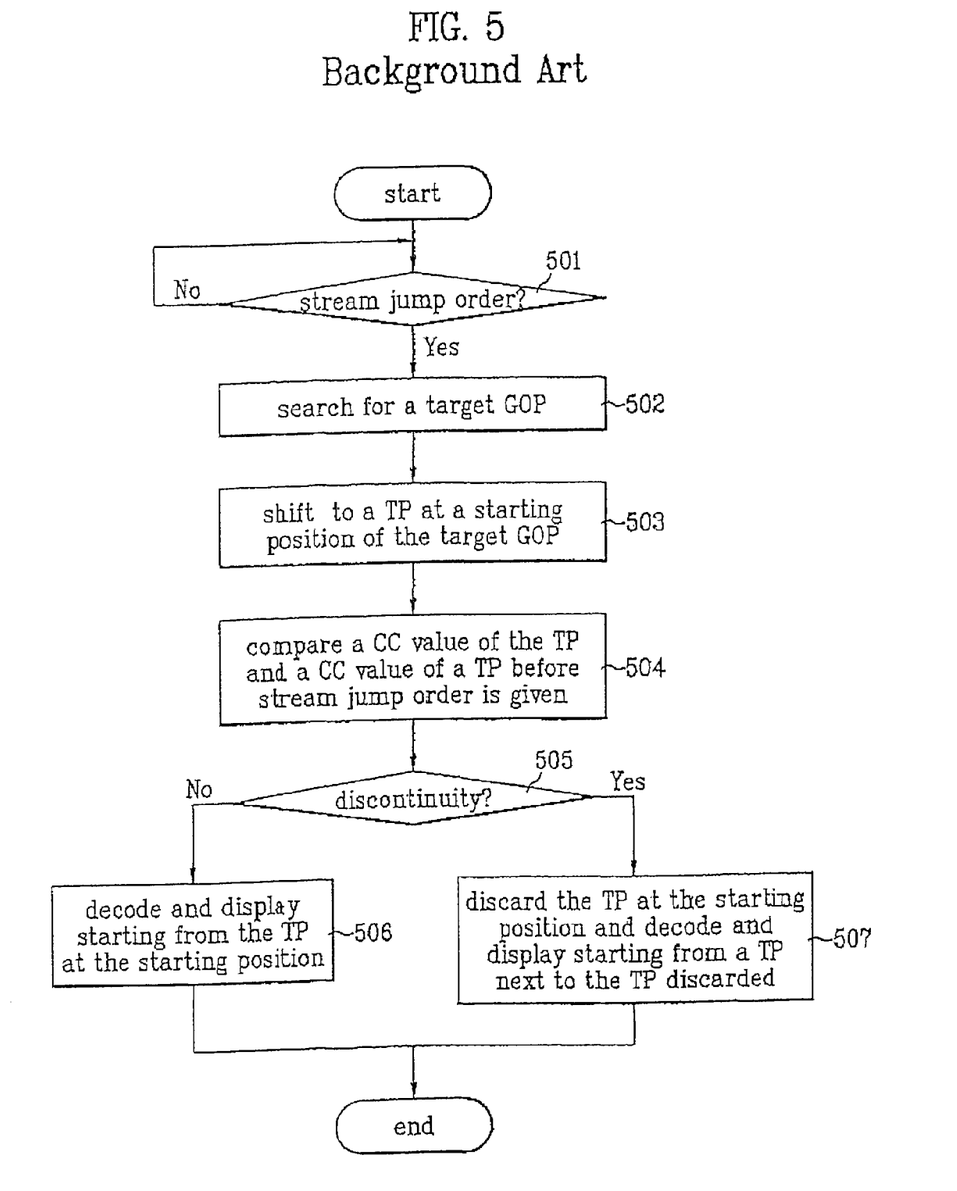
FIG. 5 illustrates a flow chart showing the steps of a related art method for making a stream jump.
Figure 6:
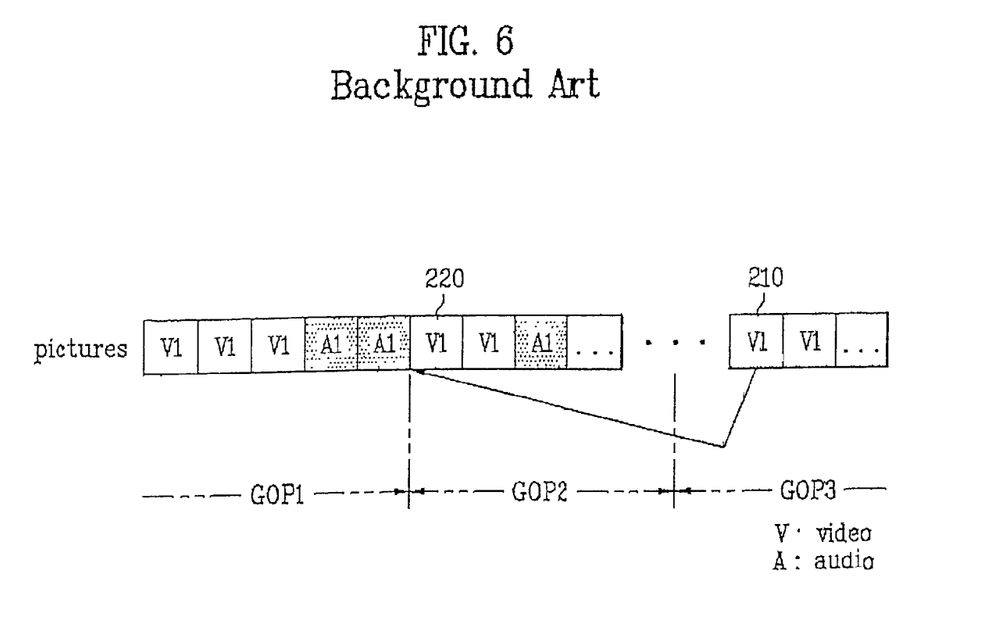
FIG. 6 illustrates an example of a related art method for making a stream jump.

FIG. 5 illustrates a flow chart showing the steps of a related art method for making a stream jump, and FIG. 6 illustrates an example of an actual stream jump.

That is, a user inputs a stream jump order, such as instant replay, advertisement skip, section repetition, fast forward, fast rewind, and the like through a key input part 409 like a remote controller (S501), a stream jump controlling part 408 searches the storage medium 405 for the target position GOP the user, or the system designates (S502). Then, the stream jump controlling part 408 starts reproduction from a TP at a starting position of a target GOP (S503).

The target position the stream jump is to be made thereto may be designated by the user, or the system. For an example, if the stream jump order is the section repetition, the target position the jump is to be made thereto is designated by the user. However, if the stream jump order is fast forward, or fast rewind, the target position the jump is to be made thereto is designated by using information on a preset value and the present position.

In the meantime, before decoding the reproduced TP, the A/V decoder 407 compares a CC value added to the reproduced TP to a CC value added to the TP at a position before making the stream jump (S504), for checking continuity of the CC value (S505). The continuity means a sequence of a progressively increasing numerals starting from, for an example, 0 to 15. Therefore, CC values of two TPs have a continuity, if, for an example, the CC value of the last TP is greater by '1' than a CC value of a prior TP.

For an example, referring to FIGS. 3 and 6, it is assumed that a stream jump order is given, when the present reproduction position is at a video TP 210 with a CC value of '1' given thereto. And, the target the stream jump is to be made thereto is a GOP2.

Then, by the user's stream jump order, the GOPs are searched, for a GOP having information meeting the order, i.e., a target GOP (GOP2). Since the GOPs have picture indices different from one another for making each of the GOP distinctive, the target GOP (GOP2) can be found with easy by using the picture indices.

Then, the reproducing position of the PVR is shifted to a TP at a starting position of the required GOP (GOP 2) (210→220), and a scene the user desires is reproduced.

If the two CC values have continuity, for an example, as shown in FIG. 3, if a CC value added to the video TP 210 prior to a stream jump is '1', and a CC value added to the video TP 220 at a starting position of the target GOP is '2', the reproducing video TP 220 is decoded and displayed regularly at the A/V decoder 407 (S506).

In the meantime, a reproducing position is shifted from on TP to another TP, which have the same PIDs, for making a stream jump, a gap of CC values occurs at a probability of 15/16. Therefore, if the steam jump is made without an appropriate disposal of the CC value gap, a general decoder produces a decoding error, and a broken picture is displayed. For an example, as shown in FIG. 3, if a CC value added to the video TP 210 prior to a stream jump is '1', and a CC value added to the video TP 220 at a starting position of the target GOP is '6', there is a discontinuity occurred between the two CC values of the two TPs. Then, the A/V decoder 407 discards the reproduced video TP 220 without decoding, and the required decoding and display is made starting from the next TP (S507).

Since the discarded video TP is a TP at a starting position of the GOP, the TP has important information, such as the picture header information. The A/V decoder 407 can not decode the picture if the A/V decoder 407 is not provided with the picture header information, but a decoding error is produced. Accordingly, a regular display can not be made, but a broken picture is displayed. Moreover, if there is an error at a picture in a particular GOP, the decoding may not be done properly, resulting to have broken pictures for the GOP.

Thus, the related art method for making a stream jump has a problem of broken picture caused by shifting to a reproducing position without taking a decoder performance for the CC value of each TP into account, to produce a decoding error at a discontinuity of the CC values.

SUMMARY OF THE INVENTION

Accordingly, the present invention is directed to a digital TV system, and a method for making a stream jump therein that substantially obviates one or more of the problems due to limitations and disadvantages of the related art.

An object of the present invention is to a digital TV system, and a method for making a stream jump therein, which can eliminate broken picture phenomenon in making a stream jump without additional device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the digital TV system with a PVR function includes a storage medium for storing a broadcasting signal if recording, or a time shift function is set, a key input part for providing a stream jump order through a user, a stream jump controller for receiving a stream jump order from the key input part, searching the storage medium for a target GOP having the user, or a system designated, and changing a reproducing position to a TP next to a TP having a picture header among TPs in a prior picture positioned right forward of the searched target GOP, and a decoder for determining decoding of every TP starting from the TP at the reproducing position changed at the stream jump controller, and carrying out decoding according to a result of the determination.

The decoder decodes, not a data on a TP at the reproducing position to a last TP in the picture because the data has no picture header information, but a data on a TP at a starting position of the target GOP.

The stream jump controller receives a stream jump order from the key input part, searches the storage medium for a target GOP having the user, or a system designated, and changes a reproducing position to a TP having continuity with a CC value of a TP at a position before making a stream jump among TPs in a prior picture positioned right forward of the searched target GOP.

In another aspect of the present invention, there is provided a method for making a stream jump in a digital TV with a PVR function, including the steps of (a) receiving a stream jump order from a user, (b) upon reception of the stream jump order, searching the storage medium for a target GOP the user, or a system designated, and changing a reproducing position to a TP next to a TP having a picture header among TPs in a prior picture positioned right forward of the searched target GOP, and (c) determining decoding of every TP starting from the TP at the reproducing position, and carrying out decoding according to a result of the determination.

In further aspect of the present invention, there is provided a method for making a stream jump in a digital TV with a PVR function, including the steps of (a) receiving a stream jump order from a user, (b) upon reception of a stream jump order from the key input part, searching the storage medium for a target GOP having the user, or a system designated, and changing a reproducing position to a TP having continuity with a CC value of a TP at a position before making a stream jump among TPs in a prior picture positioned right forward of the searched target GOP, and (c) determining decoding of every TP starting from the TP at the reproducing position, and carrying out decoding according to a result of the determination.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 7:
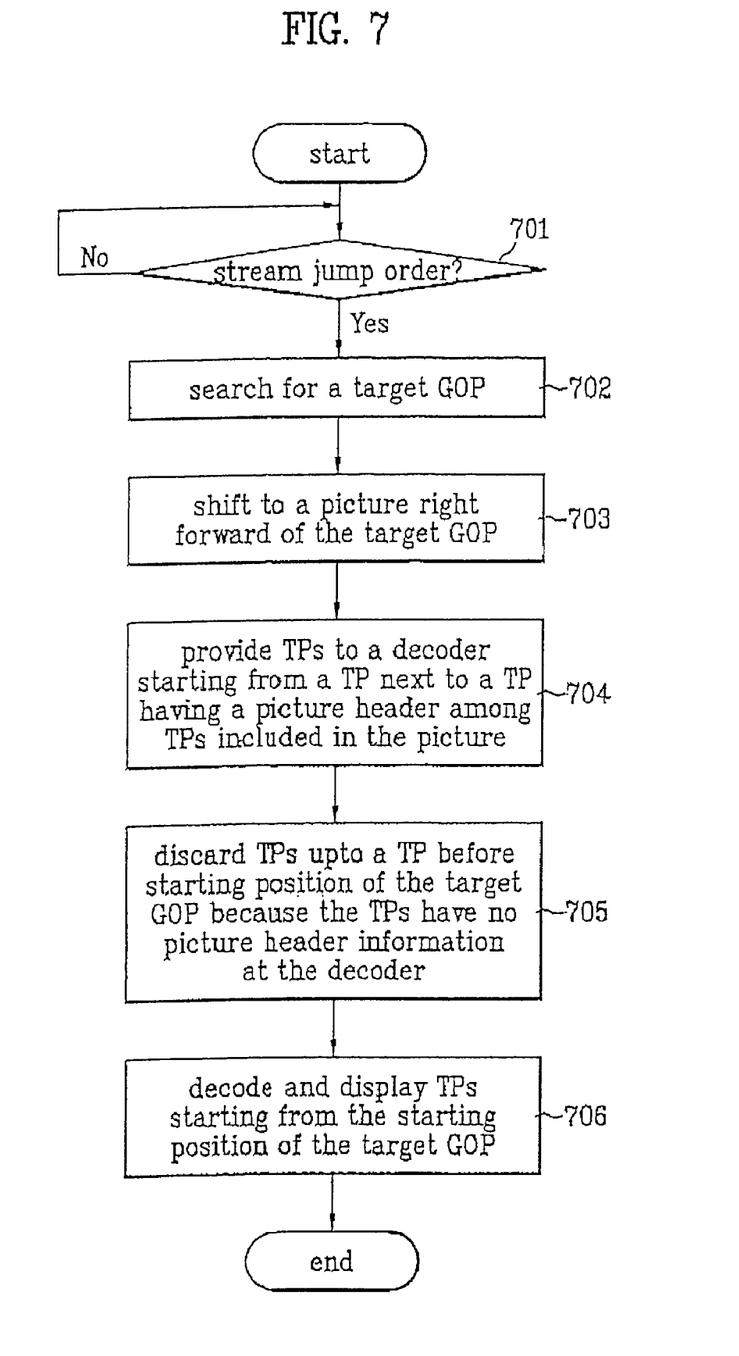
FIG. 7 illustrates a flow chart showing the steps of a method for making a stream jump in accordance with a preferred embodiment of the present invention.

Reference will now be made in detail to the preferred embodiments of the present invention, examples of which are illustrated in the accompanying drawings. FIG. 7 illustrates a flow chart showing the steps of a method for making a stream jump in accordance with a preferred embodiment of the present invention, and FIG. 8 illustrates a method for making a stream jump in accordance with a preferred embodiment of the present invention.

When a user inputs a stream jump order, such as instant replay, advertisement skip, section repetition, fast forward, fast rewind, and the like, in the middle of program watch through a key input part 409, such as a remote controller (S701), a stream jump control part 408 searches the storage medium 405 for a target GOP the user, or a system designated (S702). Then, the reproducing position is shifted to a picture right forward of the searched target GOP (S703), and the reproduction is started from a TP next to a TP which includes a picture header within the TPs in the right forward picture (S704).

Figure 8:
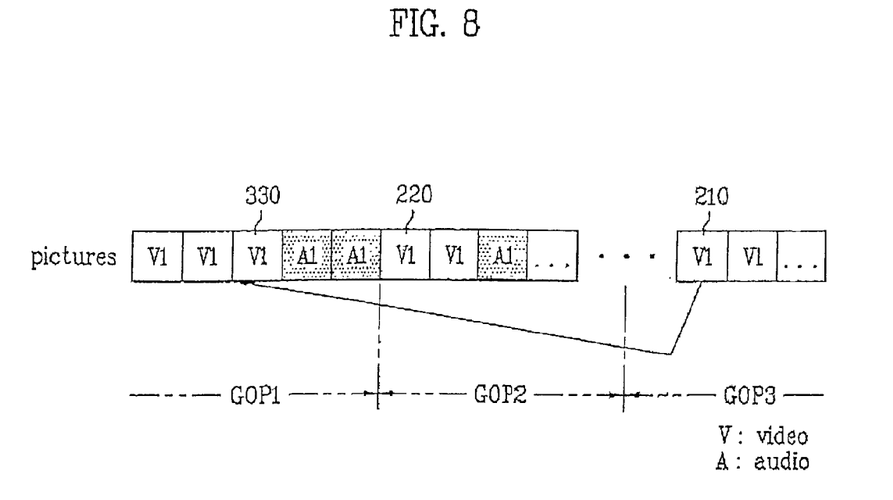
FIG. 8 illustrates a method for making a stream jump in accordance with a preferred embodiment of the present invention.

For an example, as shown in FIG. 8, it is assumed that the present reproducing position is a video TP (210) of a GOP3, a CC value given to the video TP (210) is '1', and a stream jump order is given thereto. A target GOP the stream jump is to be made thereto is GOP2. Then, the stream jump controller 408 searches the GOPs in response to the stream jump order from the user for a GOP having information meeting the stream jump order, i.e., the target GOP (GOP2), and shifts the reproducing position to a TP 330 next to a TP having a picture header among TPs in a picture right forward of the target GOP (GOP2) (i.e., a last picture of GOP1).

That is, the TPs are provided to the A/V decoder 407 starting from a TP 330 next to the TP having a picture header among TPs of a picture right forward of the target GOP (GOP2).

Since the GOPs have picture indices different from one another for making a GOP distinctive from others, the target GOP (GOP2) can be found by using the picture indices, with easy. Moreover, if the picture header information included in each picture is referred to, a prior picture right forward of the target GOP (GOP2) can be found with easy. As the header of each TP has PID information indicating a signal carrying a payload, the TP 330 next to the TP having the picture header within a picture right forward of the target GOP (GOP2) can be found with easy if the PID information is used.

Meanwhile, the A/V decoder 407 makes no decoding for a picture without the picture header.

Therefore, upon reception of the TP 330 next to a TP having the picture header among TPs of a picture right forward of the target GOP (GOP2), the A/V decoder 407 makes no decoding for the TP 330, but discards (S705). This no decoding continues until a TP 220 at a starting position of the target GOP (GOP2) is transmitted.

In this instance too, the A/V decoder 407 checks a continuity of CC values before and after the decoding, which is meaningless in the present invention.

That is, if the TP 330 is discarded as a discontinuity is occurred between the CC value of the TP 210 before the stream jump and the CC value of the TP 330 after the stream jump, though the CC values have a continuity starting from the next TP, since the next TP is also a TP having no picture header, the next TP is discarded without being decoded. It is because payload of one picture has at least a few tens of TPs. However, the CC values thereafter have continuities. That is, CC values of successive TPs have a continuity, the TPs of the picture are not decoded, but discarded.

The foregoing process is continued until a TP 220 at a starting position of the target GOP is received.

Upon reception of the TP 220 at a starting position of the target GOP, the AN decoder 407, the A/V decoder 407 decodes and displays starting from a data of the TP 220 (S706). That is, the TP 220 at the starting position of the target GOP (GOP2) has the picture header information, and the CC values are continuous, decoding to the TP 220 can be made regularly.

In this instance, because a picture right forward of the target GOP (GOP2) is not decoded, but discarded, display signal is not presented for a while until a data of a first TP 220 of the target GOP (GOP2) is reproduced. However, the reproduction time period of the region is extremely short in view of a time sequence, a signal of an actual display is sensed continuous.

In conclusion, in the present invention, no decoding error is occurred regardless of the continuity of the CC values in making a stream jump.

As another embodiment of the present invention, upon reception of the stream jump order, after a last TP having a continuity with a CC value of the TP before the stream jump order is made among TPs in a picture right forward of the target GOP is found, the reproduction may be made starting from the last TP. For an example, if the CC value of the TP 210 before the stream jump order is given is '1', the reproduction may be made starting from a last TP with a CC value of '2' among TPs in a picture right forward of the target GOP. In this instance, if the CC values in the TPs, and the PID values, are referred to, the last TP having continuity with the CC value of the TP at a position before the stream jump is made can be found among the TPs of the right forward picture, with easy.

Alikely, in this instance too, the data of the last TP having no continuity with the CC value is not decoded, but discarded. This is because there is no picture header information in the picture having the last TP included thereto. However, the CC values of the video TP 210 before the stream jump is made, and the last video TP after the stream jump is made have continuity, there is no decoding error occurred even if the decoding is carried out starting from the TP 220 at a starting position of the target GOP. Since the TP at the starting position of the target GOP has header information of the GOP, and header information of the picture, and the CC values are continuous too, the decoding is made regularly.

Thus, the user can watch a desired scene without an error.

In the meantime, the method for making a stream jump of the present invention is applicable to other fields which are based on the MPEG-2, with easy.

As has been explained, the digital TV system with a PVR function and method for making a stream jump therein of the present invention have an advantage in that no decoding error is occurred in decoding the TPs of a target GOP, while a continuity of the CC values is maintained. That is, no picture is broken even if the stream jump is made, because the reproduction is made starting from a TP next to a TP having the picture header among TPs of a picture right forward of the target GOP in making the stream jump.

It will be apparent to those skilled in the art that various modifications and variations can be made in the digital TV system with a PVR function and method for making a stream jump therein of the present invention without departing from the spirit or scope of the invention. Thus, it is intended that the present invention cover the modifications and variations of this invention provided they come within the scope of the appended claims and their equivalents.

What is claimed is:

1. A digital TV system with a personal video recorder (PVR) function, comprising:
   a storage medium for storing a broadcasting signal if recording, or a time shift function is set;
   a key input part for providing a stream jump order through a user;
   a stream jump controller for receiving a stream jump order from the key input part, searching the storage medium for a target GOP the user or a system designated, and changing a reproducing position to a transport packet (TP) next to a TP having a picture header among TPs in a prior picture positioned right forward of the searched target GOP; and
   a decoder for determining decoding of every TP starting from the TP at the reproducing position changed at the stream jump controller, and carrying out decoding according to a result of the determination.

2. A digital TV system as claimed in claim 1, wherein the stream jump controller searches for the target GOP with reference to a picture indices included in the GOPs.

3. A digital TV system as claimed in claim 1, wherein the stream jump controller searches for a prior picture with reference to picture header information included in the pictures.

4. A digital TV system as claimed in claim 1, wherein the stream jump controller searches for a TP next to a TP having a picture header among TPs in a prior picture with reference to a PID included in each TP.

5. A digital TV system as claimed in claim 1, wherein the decoder decodes no data from a TP at the reproducing position to a last TP in the picture because the data has no picture header information.

6. A digital TV system as claimed in claim 1, wherein the decoder decodes a data on a TP at a starting position of the target GOP.

7. A digital TV system as claimed in claim 1, wherein the stream jump controller receives a stream jump order from the key input part, searches the storage medium for a target GOP the user or the system designated, and changes a reproducing position to a TP having continuity with a continuity counter (CC) value of a TP at a position before making a stream jump among TPs in a prior picture positioned right forward of the searched target GOP.

8. A digital TV system as claimed in claim 7, wherein the decoder decodes, not a data on a TP at the reproducing position to a last TP in the picture because the data has no picture header information, but a data on a TP at a starting position of the target GOP.

9. A digital TV system as claimed in claim 7, wherein the stream jump controller searches for a last TP having continuity with a CC value of a TP at a position before making a stream jump among TPs in a prior picture with reference to a CC value and a PID included in each TP.

10. A method for making a stream jump in a digital TV with a personal video recorder (PVR) function, having a storage medium for storing a broadcasting signal, and a decoder for decoding a transport stream (TS) reproduced at the storage medium in a TS packet unit, the method comprising the steps of:

(a) receiving a stream jump order from a user;
(b) upon reception of the stream jump order, searching the storage medium for a target GOP the user or a system designated, and changing a reproducing position to a transport packet (TP) next to a TP having a picture header among TPs in a prior picture positioned right forward of the searched target GOP; and
(c) determining decoding of every TP starting from the TP at the reproducing position, and carrying out decoding according to a result of the determination.

11. A method as claimed in claim 10, wherein the step (b) includes the step of searching for the target GOP with reference to a picture index included in each GOP.

12. A method as claimed in claim 10, wherein the step (b) includes the step of searching for a prior picture with reference to a picture header information included in each picture.

13. A method as claimed in claim 10, wherein the step (b) includes the step of searching for a TP next to a TP having a picture header among TPs in a prior picture with reference to a PID included in each TP.

14. A method as claimed in claim 10, wherein the step (c) includes the step of decoding, not a data on a TP at the reproducing position to a last TP in the picture because the data has no picture header information, but a data on a TP at a starting position of the target GOP.

15. A method as claimed in claim 10, wherein the step (b) includes the step of, upon reception of a stream jump order from the key input part, searching the storage medium for a target GOP the user or the system designated, and changing a reproducing position to a transport packet (TP) having continuity with a continuity counter (CC) value of a TP at a position before making a stream jump among TPs in a prior picture positioned right forward of the searched target GOP.

16. A method for making a stream jump in a digital TV with a personal video recorder (PVR) function, having a storage medium for storing a broadcasting signal, and a decoder for decoding a transport stream (TS) reproduced at the storage medium in a TS packet unit, the method comprising the steps of:

(a) receiving a stream jump order from a user;
(b) upon reception of a stream jump order from the key input part, searching the storage medium for a target GOP the user or a system designated, and changing a reproducing position to a transport packet (TP) having continuity with a continuity counter (CC) value of a TP at a position before making a stream jump among TPs in a prior picture positioned right forward of the searched target GOP; and
(c) determining decoding of every TP starting from the TP at the reproducing position, and carrying out decoding according to a result of the determination.

17. A method as claimed in claim 16, wherein the TP at a reproducing position in the step (b) is a last TP having continuity with a CC value of a TP at a position before making a stream jump among TPs in a prior picture at a position in right forward of the searched target GOP.

18. A method as claimed in claim 16, wherein the step (b) includes the step of searching a TP having continuity with a CC value of a TP at a position before making a stream jump among TPs in a prior picture with reference to a CC value and a PID included in each TP.

19. A method as claimed in claim 16, wherein the step (c) includes the step of decoding, not a data on a TP at the reproducing position to a last TP in the picture because the data has no picture header information, but a data on a TP at a starting position of the target GOP.

20. A method as claimed in claim 16, wherein the step (b) includes the step of, upon reception of the stream jump order, searching the storage medium for a target GOP the user or the system designated, and changing a reproducing position to a TP next to a TP having a picture header among TPs in a prior picture positioned right forward of the searched target GOP.

* * * * *